MAGNETIC ABRASIVE DISC HOLDER AND DISC

Filed Nov. 20, 1962 2 Sheets-Sheet 1

INVENTOR.
PAUL P. ERENYI
BY Fulwider, Patton, Rieber, Lee, and Utecht
ATTORNEYS

MAGNETIC ABRASIVE DISC HOLDER AND DISC

Filed Nov. 20, 1962 2 Sheets-Sheet 2

INVENTOR.
PAUL P. ERENYI
BY Zulwider, Patton, Rieber Lee, and Utecht
ATTORNEYS

United States Patent Office 3,226,888

Patented Jan. 4, 1966

3,226,888
MAGNETIC ABRASIVE DISC HOLDER AND DISC

Paul P. Erenyi, 816 Victor Ave., Inglewood, Calif.

Filed Nov. 20, 1962, Ser. No. 238,920
5 Claims. (Cl. 51—362)

This invention relates to a magnetic, abrasive disc holder and its connection with the abrasive disc which, altogether, is a tool used for grinding and polishing.

The invention consists of two parts: (1) the grinding tool, the coated abrasive disc affixed to an iron metal disc, (2) the holder, which drives the disc and the affixed metal disc, and also gives support for the coated abrasive at its periphery against shocks and pressures in a firm but flexible manner. The holder is turned by a power motor at the desired speed.

It is an object of the present invention to provide a tool for the purpose of grinding and polishing in a simple efficient manner, usable on any object that is to be polished and ground.

It is also an object of the present invention to provide a tool for the purpose of grinding and polishing at high speed as well as at lower speed (r.p.m.).

The present invention also intends to provide a grinding tool which will be attractive in appearance and safe in its operation.

It is also intended to provide a tool which will be capable of standing high-speed rotation with the exclusion of vibration.

Furthermore, it is also intended to provide an abrasive disc holder and disc compact which will last long in use and will permit the quickest possible exchange of worn out discs to new ones with the shortest possible interruption of the grinding and polishing and with the least possible wear of the holder itself.

An additional object of the invention is to provide a holder for the said purpose with such a construction that the attaching metal disc for the required performance may be manufacturable at the lowest possible cost through its special design which is aimed at low production cost.

Still additional objects of the invention are to provide an abrasive disc and holder so designed that a small diameter metal disc will hold the coated abrasive disc, the disc and holder will conserve the grinding surface of the abrasive surface, and the design will require a very small used quantity of metal for its production. It is also an object to provide an efficient connection between the abrasive disc and the rotator power motor for the purpose of grinding and polishing.

It is a further object of the invention to provide a holder and disc which can be produced, packaged, transported in large quantities at a comparatively low cost, and which can be made in any size for the said purposes.

It is an additional object of the invention to provide efficient contact between the holder and the abrasive disc by an embedded magnet that attracts the metal disc affixed to the abrasive disc.

Another object of the invention is to provide a grinding tool consisting of two pieces, the exchangeable grinding disc and the permanently used holder so designed and built that the holder will transmit the rotating motion given by the power motor to the abrasive disc, without slipping. The device of this invention is constructed so that it will withstand high speed and powerful shocks, making use of the magnetic force to maintain the connection between the iron disc carrying the abrasive disc and the driving holder. The invention contains two variations: the first variation is explained in FIGURES 1 to 12, and the second variation in FIGURES 12 to 16.

Still additional objects, benefits, and advantages of the invention will become evident from a study of the following detailed description taken in conjunction with the accompanying drawing in which.

Figure 1:
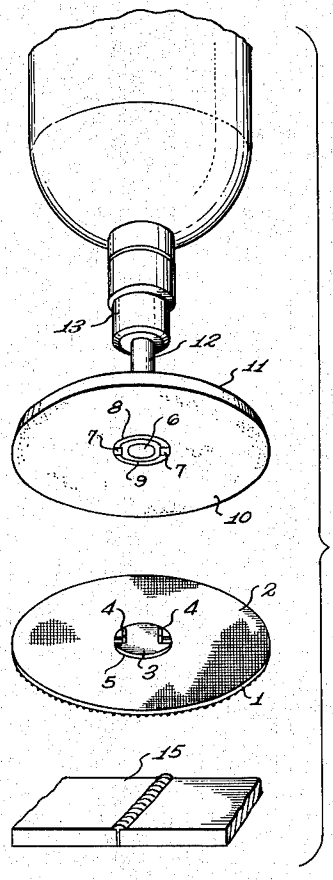
FIGURE 1 is a perspective view of the work to be ground, the abrasive disc holder accompanying abrasive disc, and the power motor chuck.
Figure 7:
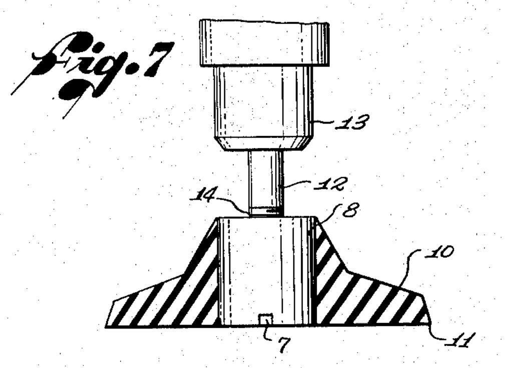
FIGURE 7 is a cross-sectional view of holder at line 7—7 of FIGURE 6.

Referring now, specifically, to FIGURE 1 of the drawing, the present invention is seen to include a coated abrasive disc 1 with an abrasive surface and its supporting fabric material 2 glued to the center of this, to which an iron metal disc 3 having ears 4 is glued to the center of the coated abrasive disc with strong adhesive 5. On the holder pad there is a permanent magnet 6 having two or more grooves 7 on its surface shaped so that the ears 4 on the iron metal disc 3 will fit in the grooves. The grooves are milled into the magnet or into a surrounding cylinder of softer material 8 such as soft iron which acts to provide a low reluctance magnetic path from the imbedded end of the magnet 6 to the exposed end adjacent the metal disc 5. In this way an air gap is provided that may be closed by the disc 5 acting as an armature. For the purpose of insulating the permanent magnet 6 from the surrounding iron cylinder 8 there is a layer 9 of aluminum or any other non-magnetic material that keeps the poles of 6 and 8 a distance from each other. It should be understood that instead of using the type of magnetic power supply compartment which consists of 6, 8, and 9 of which the only source of magnetic force is 6, with a surrounding yoke 8, there can be used a single, one-piece magnet for the same purpose the cross-sectional drawing of which would look like 8 on FIGURE 7. The above given magnetic power supplier compartment type has been used for gaining more power for a given comparatively small piece of magnet which it does in a ratio of 1 to 5, or more.

The permanent magnet or the magnetic power supplying compartment is surrounded by molded rubber 10 which has a fabric reinforcement 11 preventing expansion caused by centrifugal force during its operation. To connect the permanent magnet with the power motor 13 there is a shaft 12 connected to the magnet as by a threaded section 14. The object to be ground is indicated by the numeral 15.

Figures 6, 8, 9, 10, 11, 12, 13, 14, 15, 16:
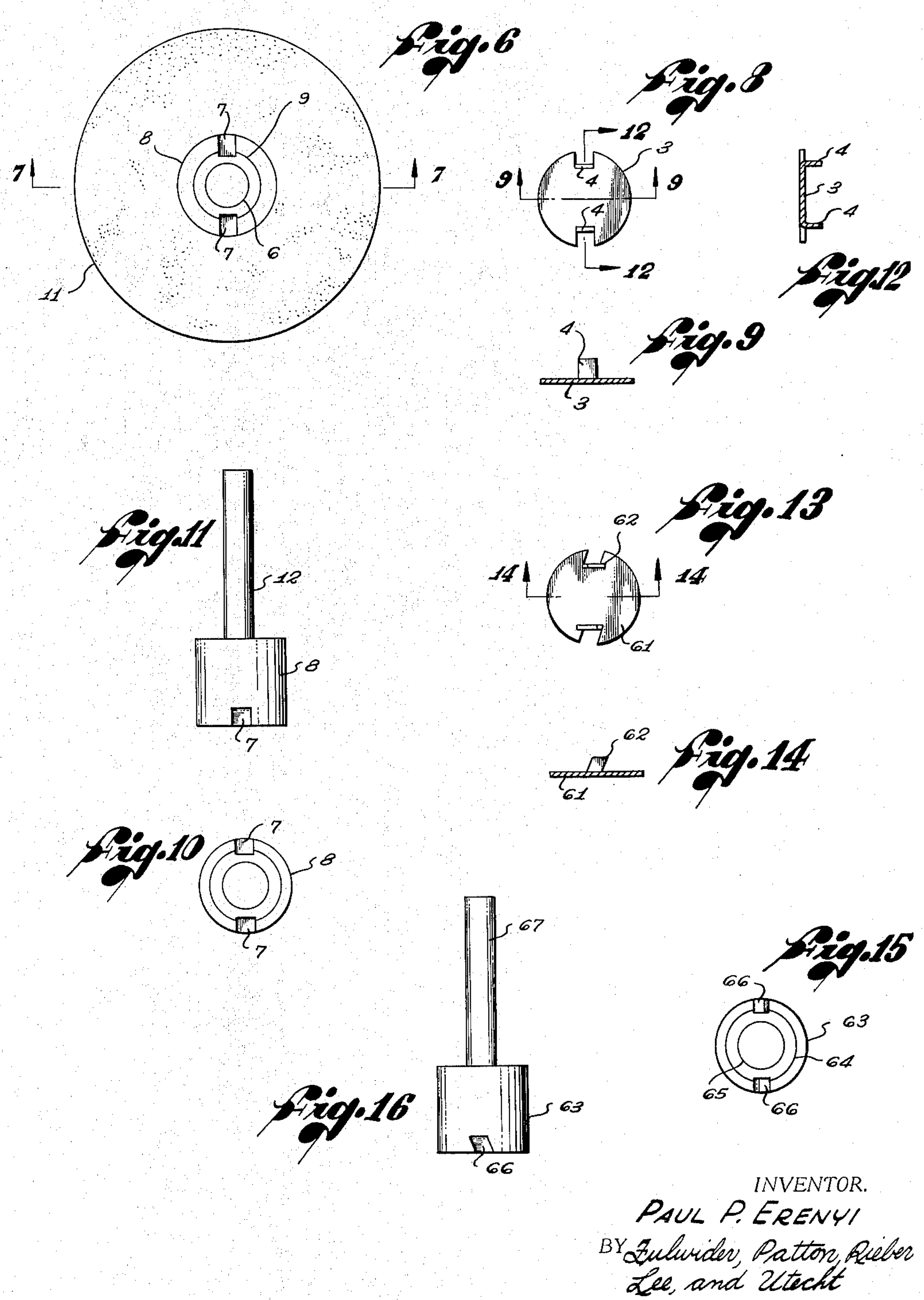
FIGURE 6 is an elevational view of holder pad seen at FIGURE 1 in point 10.
FIGURE 8 is a plan view of iron metal disc seen in FIGURE 1 at point 3.
FIGURE 9 is a cross-sectional view of the iron metal disc seen taken on the line 9—9 in FIGURE 8.
FIGURE 10 is an end view of the permanent magnet or magnetic power supplying compartment seen in FIGURE 1.
FIGURE 11 is a side view of the magnet or magentic power supplying compartment and its shaft seen in FIGURE 4.
FIGURE 12 is a cross-sectional view of the iron metal disc taken on the line 12—12 in FIGURE 8.
FIGURE 13 is an elevational view of a variation 2 of the metal disc shown in FIGURE 8.
FIGURE 14 is a cross-sectional view of the disc shown in FIGURE 13, taken on the line 14—14 of that figure.
FIGURE 15 is an end view of the magnet or magnetic power adapted to receive the form of disc shown in FIGURES 13 and 14.
FIGURE 16 is a side view of the magnet or magnetic power supplying compartment shown in FIGURE 15.

In the variation seen in FIGURES 13 through 16, the ears 62 are cut out from the metal disc 61 in an angular shape, and the cooperating grooves 66 of the magnet are similarly cut at an angle as seen in FIGURE 14 and FIGURE 15. As shown there, the permanent magnet 65 is surrounded by the aluminum layer 64 and the outside iron cylinder 63 with the grooves shown at 66.

Figure 2:
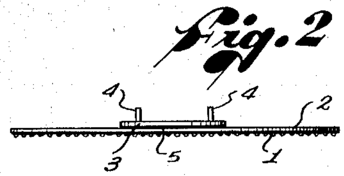
FIGURE 2 is a side view of abrasive disc and its attached iron metal disc seen in FIGURE 1 at 1 and 3.
Figure 4:
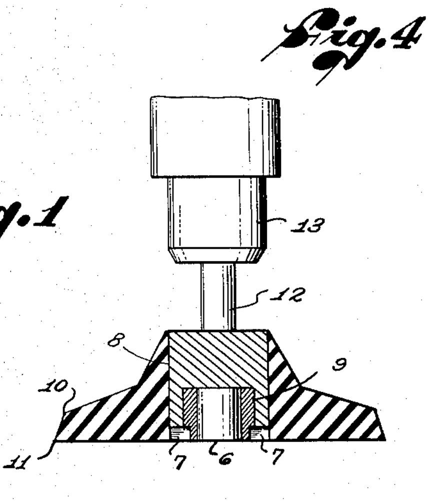
FIGURE 4 is a cross-sectional view of holder seen in FIGURE 3 at the line of 4—4.
Figure 5:
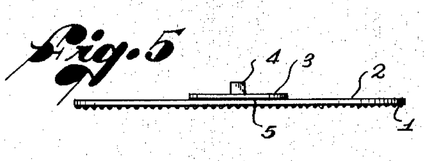
FIGURE 5 is a side view of abrasive disc and iron metal disc seen in FIGURES 1, 2, 3, and 4.
Figure 3:
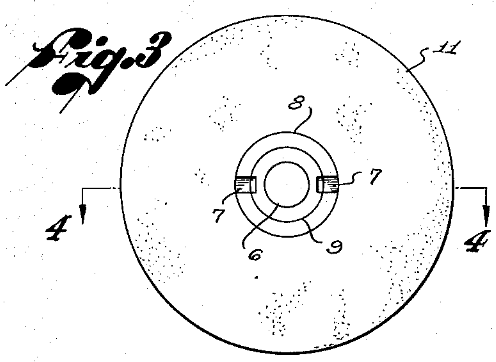
FIGURE 3 is an elevational view of disc holder seen in FIGURE 1.

The distance between the ears 4 in FIGURE 2 or FIGURE 12 is equal to the distance between the corresponding grooves shown in FIGURE 3 or FIGURE 14, respectively.

The shaft 67 may be any length or any diameter, and is preferably held in the magnet by screw threads.

The operation of this tool will now be readily understood. An abrasive disc 1 having the metal disc 3 is placed on the magnetic holder pad with its ears 4 placed into the grooves 7 on the permanent magnet or on the permanent magnetic power supplying the compartment so that the abrasive disc will be turned by the coupling effect of the combined construction in which the magnet 6 keeps the iron disc 3 in close contact with itself. Thus the ears are forced into the grooves by which means the rotation of the holder is perfectly transmitted to the abrasive disc for the purposes of grinding or polishing objects such as 15. After the abrasive surface is worn out it can be easily and quickly exchanged by pulling the iron disc 3 apart from the magnet 6 and placing a new disc on it, continuing the grinding and polishing with short interruption of the operation of grinding.

When the grinding and polishing requirements are such that high speed (10,000–12,000 r.p.m.) is recommended, it is suggested the type described in variation 2, shown in FIGURES 13 to 16 be used. The angularly positioned grooves 66 and the ears 62 will give stronger grip to the holder, allowing quick exchange of the worn out abrasive disc through which a considerable amount of time can be saved.

While this invention has been described with particular reference to the construction shown in the drawings and while various changes may be made in the detail construction, it shall be understood that such changes shall be within the spirit and scope of the present invention as defined by the appended claims. Having thus completely and fully described the invention what is now claimed as new and desired to be protected by Letters Patent of the United States is:

1. An abrasive disc and holder therefor which includes:
a disc of abrasive material;
a magnetizable member centrally located with respect to said abrasive disc and fixedly held to the back thereof, said magnetizable member having a plurality of ears projecting therefrom;
a driving member adapted to releasably receive said abrasive discs and said magnetizable member, said driving member including a backing member adapted to drive and reinforce said abrasive disc and having slots adapted to receive said ears of said magnetizable member;
and magnetic means mounted in said driving member and positioned to attract said magnetizable member and thereby releasably hold said ears in said slots.

2. An abrasive disc and holder therefor which includes:
a disc of abrasive material;

a magnetizable member centrally located with respect to said abrasive disc and fixedly held to the back thereof, said magnetizable member having a plurality of ears projecting therefrom;
a driving member adapted to releasably receive said abrasive disc and said magnetizable member, said driving member including a backing member adapted to drive and reinforce said abrasive disc and having slots adapted to receive said ears of said magnetizable member; and
a permanent magnet centrally located in said driving member and positioned to attract said magnetizable member to it, thereby releasably retaining said ears in said slots, said ears and said slots acting to transmit the torque from said driving member to said abrasive disc.

3. An abrasive disc and holder therefor which includes:
a flexible disc of abrasive material;
a magnetizable member centrally located with respect to said abrasive disc and fixedly held to the back thereof, said magnetizable member having a plurality of ears projecting therefrom;
a generally disc-shaped driving member of resilient construction adapted to releasably receive said abrasive disc and said magnetizable member, said driving member acting as a deformable backing member for said flexible abrasive disc, said driving member having slots adapted to receive said ears of said magnetizable member to drive said abrasive disc; and
magnetic means mounted in said driving member and positioned to attract said magnetizable member and thereby releasably hold said ears in said slots.

4. An abrasive disc and holder therefor which includes:
a flexible disc of abrasive material;
a magnetizable member centrally located with respect to said abrasive disc and fixedly held to the back thereof, said magnetizable member having a plurality of ears projecting therefrom;
a generally disc-shaped driving member of resilient construction adapted to releasably receive said abrasive disc and said magnetizable member, said driving member acting as a deformable backing member for said flexible abrasive disc, said driving member having slots adapted to receive said ears of said magnetizable member to drive said abrasive disc; and
a permanent magnet centrally located in said driving member and positioned to attract said magnetizable member to it, thereby releasably retaining said ears in said slots, the attraction exerted by said magnet being sufficient to support the weight of said abrasive disc and said magnetizable member.

5. A device as defined in claim 4 in which said ears and said slots are angularly positioned in such a manner that rotation of said driving member in its usual driving direction urges said magnetizable member and said abrasive disc toward said driving member.

References Cited by the Examiner

UNITED STATES PATENTS

| | | | |
|---|---|---|---|
| 1,724,742 | 8/1929 | Albertson et al. | 51—197 |
| 2,056,182 | 10/1936 | Gardner | 51—110 |
| 2,281,722 | 5/1942 | Smith | 51—197 |

ROBERT C. RIORDON, *Primary Examiner.*

LESTER M. SWINGLE, *Examiner.*